United States Patent [19]

Sprunk

[11] Patent Number: 5,404,402
[45] Date of Patent: Apr. 4, 1995

[54] CLOCK FREQUENCY MODULATION FOR SECURE MICROPROCESSORS

[75] Inventor: Eric Sprunk, Carlsbad, Calif.

[73] Assignee: GI Corporation, Hatboro, Pa.

[21] Appl. No.: 167,782

[22] Filed: Dec. 21, 1993

[51] Int. Cl.⁶ ............................................. H04L 9/00
[52] U.S. Cl. .......................................... 380/4; 380/9;
380/10; 380/28; 380/29; 380/37; 380/46;
380/48; 380/49
[58] Field of Search ............... 380/4, 9, 10, 28, 29,
380/37, 46, 48, 49; 395/550

[56] References Cited

U.S. PATENT DOCUMENTS

| | | | |
|---|---|---|---|
| 4,819,164 | 4/1989 | Branson | 395/550 |
| 4,932,053 | 6/1990 | Fruhauf et al. | 380/4 |
| 5,001,756 | 3/1991 | Mayginnes et al. | 380/48 |

*Primary Examiner*—Gregory Bernarr E.
*Attorney, Agent, or Firm*—Barry R. Lipsitz

[57] ABSTRACT

A secure microprocessor is provided with reduced vulnerability to attack. In the past, the secure operation of such processors has been overcome by observing the behavior of the clock used by the processor. Such observations, and the prediction of subsequent clock pulses therefrom, are prevented by modulating the clock by a substantially random function to provide an unpredictable stream of clock pulses. The secure processor is responsive to the unpredictable stream of clock pulses for processing data in accordance with a security algorithm.

18 Claims, 4 Drawing Sheets

CLOCK FREQUENCY MODULATION FOR SECURE MICROPROCESSORS

BACKGROUND OF THE INVENTION

The present invention relates generally to security apparatus for information processing systems and more particularly to the implementation of a secure microprocessor with reduced vulnerability to a security breach. The invention is particularly applicable to the secure transmission of scrambled television signals, although it is by no means limited to such use.

There are many schemes available for controlling the remote descrambling of television signals. Such schemes are necessary to maintain security in subscription television systems, including cable television systems and satellite television systems. Typically, a system subscriber is provided with a descrambler connected between a television signal source (e.g., cable feed or satellite receiver) and a television set. Each subscriber's descrambler is remotely accessed by the system operator to enable or disable the receipt of specific services such as the Home Box Office movie channel or special pay-per-view sports events. One problem with such systems is that "pirates" are apt to break the system security and sell "black boxes" that enable the reception of all programming without paying for the services received. It has been difficult and expensive for system operators to contend with the piracy problem. Once a particular security system is breached, the system operator must usually replace all existing descramblers with new units that operate with a different security algorithm. In order to avoid this costly necessity, it is desirable to improve the security of such systems to make them less vulnerable to a successful attack.

In the past, access to the clock of a secure microprocessor has often been used by pirates to modify the operation of the processor, such as by high speed pulsing. The ability of a pirate to observe such clock signals is critical in mounting a successful attack to the system security. However, such observation is nearly useless if the observation does not allow prediction of the clock signal in the future. It would therefore be advantageous to preclude the observation of a clock signal. It would be further advantageous to render the observation of a portion of a clock signal useless for predicting the future operation thereof.

The present invention provides the above-mentioned advantages through a scheme in which a secure microprocessor clock is modulated in a substantially random fashion which eliminates the ability to predict the clock even if it is observable. The term "substantially random" is used because complete randomness may be difficult to achieve in a practical system. For purposes of the following disclosure and claims, the terms "random," "substantially random" and pseudorandom are meant to be synonymous and are intended to include a completely random event or an event that exhibits a sufficient degree of randomness (e.g., almost completely random) to achieve the intended result taking practical considerations, such as cost and reliability, into account. Thus, the use of the term "random" hereinafter is not meant to imply complete randomness. The term "substantially unpredictable" is meant to comprise as high a level of unpredictability as is possible using a substantially random input, and the use of the term "unpredictable" alone is intended to encompass the concept of substantially unpredictable.

SUMMARY OF THE INVENTION

In accordance with the present invention, a cryptographic processor is provided with reduced vulnerability to attack. Clock means provide a clock signal. Means are provided for modulating the clock means by a random function (i.e., completely random or pseudorandom) to provide an unpredictable stream of clock pulses. A microprocessor responsive to the unpredictable stream of clock pulses processes data in accordance with a security algorithm.

In an illustrated embodiment, the clock means comprise a ring oscillator. The modulating means vary a delay of the ring oscillator using a variable delay element. The ring oscillator can comprise an inverter having an input coupled to an output thereof via the variable delay element. The variable delay element can comprise a plurality of delay stages, each coupled to delay a signal output from the inverter by a different amount of time. The modulating means select one of the delay stages per clock pulse to output a substantially randomly delayed inverter output signal to the inverter input.

The random selection of a delay stage for each clock pulse can be accomplished using a plurality of linear feedback shift register generators of different lengths. The linear feedback shift register generators are responsive to prior clock pulses in the stream of pulses for outputting random control signals to select one of the delay stages for each successive clock pulse. Since the control signals allow the substantially random selection of a delay stage for each successive clock pulse, the occurrence of the successive clock pulses is substantially unpredictable. In a preferred embodiment, a substitution table is provided in series with the linear feedback shift register generators to increase the randomness of the control signals.

The present invention also provides apparatus for clocking a cryptographic processor to reduce its vulnerability to attack. A stream of clock pulses is provided. Delay means are provided for delaying the pulses by a plurality of different selectable delays. One of the delays from the delay means is randomly selected for each clock pulse of the stream to provide an unpredictable stream of clock pulses. Means are provided for applying the unpredictable stream of clock pulses to a clock input of the cryptographic processor.

A plurality of linear feedback shift register generators of different lengths and responsive to prior clock pulses in the stream is used to output substantially random control signals for selecting delays for subsequent clock pulses of the stream. A substitution table may be coupled in series with the linear feedback shift register generators for increasing the randomness of the control signals. In an illustrated embodiment, a multiplexer is coupled to receive the variously delayed pulses from the plurality of different selectable delays. The multiplexer is responsive to the random control signals for outputting the substantially randomly delayed pulses forming the substantially unpredictable stream.

A method is provided for clocking a cryptographic processor to reduce its vulnerability to attack. Clock pulses are randomly (i.e., completely or pseudorandomly) delayed in a clock stream to provide an unpredictable clock signal. The cryptographic processor is clocked with the unpredictable clock signal to thwart efforts to observe a periodic behavior of the processor. The pulses in the unpredictable clock signal are delayed at a varying rate within a range that does not extend beyond a minimum and maximum operating rate of the cryptographic processor. In a preferred embodiment, the range extends substantially from the minimum operating rate to the maximum operating rate of the cryptographic processor.

DETAILED DESCRIPTION OF THE INVENTION

The present invention enhances the security of a secure microprocessor by rendering it extremely difficult, if not impossible, to observe a clock signal and predict the occurrence of subsequent clock pulses therefrom. In implementing the present invention, it is desirable to resist pirate attacks without unduly complicating or limiting the function of the existing cryptographic processor. The present invention accomplishes this goal by modulating the signal which clocks the processor on a pseudorandom basis to render the time at which each successive clock pulse occurs completely unpredictable. As noted above, the use of the term "pseudorandom" herein is not meant to exclude completely random behavior, and vice-versa. In implementing the present invention, it is desirable to meet at least the following requirements:

1. The pseudorandom behavior of the modulation must be strictly controllable so that all parameters of desired cryptographic performance can be met with a reasonable margin of error. Yet, there should be no time period over which the clock could be considered predictable or unmodulated.

2. Care should be taken to make observation of clock frequency as difficult as possible in both the time domain and the frequency domain, since these are both natural observation perspectives.

3. The predictability of modulation should be independent of any type of reset signal. Thus, if an attacker is experimenting it will not be possible to affect the modulation in any way, such as bringing it to a known state via a reset signal.

Figure 1:
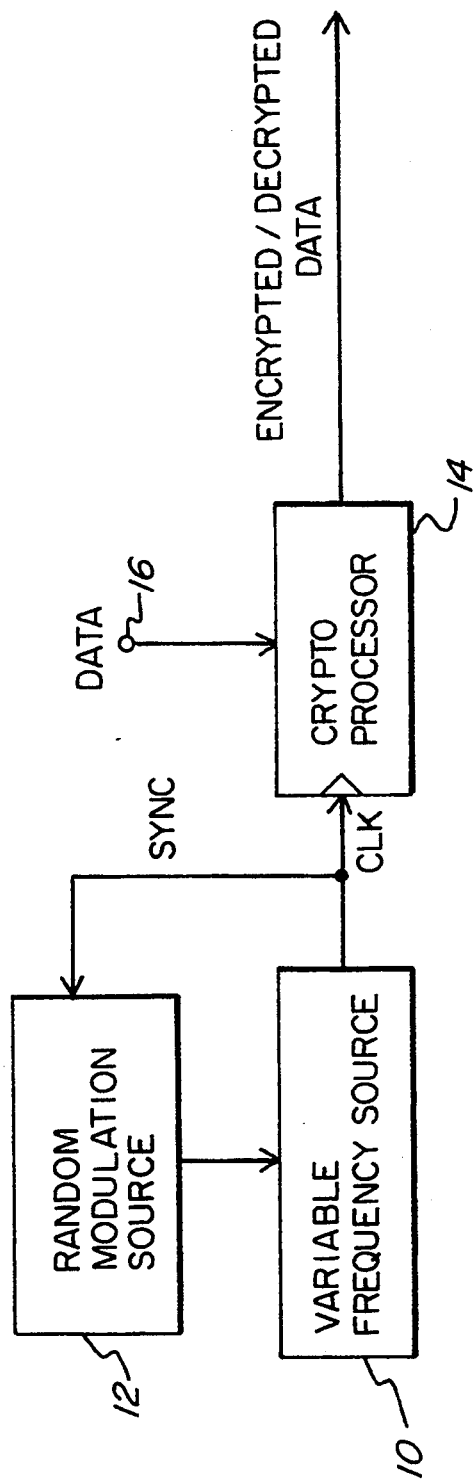
FIG. 1 is a block diagram of a cryptographic processor which is clocked by a random and unpredictable clock signal in accordance with the present invention.

FIG. 1 illustrates a preferred implementation of the invention in general form. A variable frequency source ("clock") 10 produces a clock signal with periodic clock pulses. Frequency source 10 can comprise an analog or digital circuit. For example, a tunable digital source (such as a ring oscillator), a tunable analog oscillator, or a plurality of selectable analog or digital fixed frequency oscillators can be used. Variable tuning or selection of the clock output frequency is effected using a substantially random "modulation" circuit 12 that randomly varies each pulse of the clock signal to render the timing of successive pulses unpredictable. The unpredictable pulse stream "CLK" is output from the variable frequency source 10 and used to clock a conventional crypto processor 14 for the encryption or decryption of data entered via terminal 16.

As noted, clock 10 can comprise a ring oscillator which can include one or more inverters coupled in series with a delay, such that the output of the final series inverter is coupled to the input of the initial inverter. Modulation of the clock signal can be provided by varying the total delay around the ring on a random basis. For example, the total delay around the ring can be varied in integer gate delay amounts. Such an implementation actually provides period modulation, which is related to frequency by reciprocation.

Figure 2:
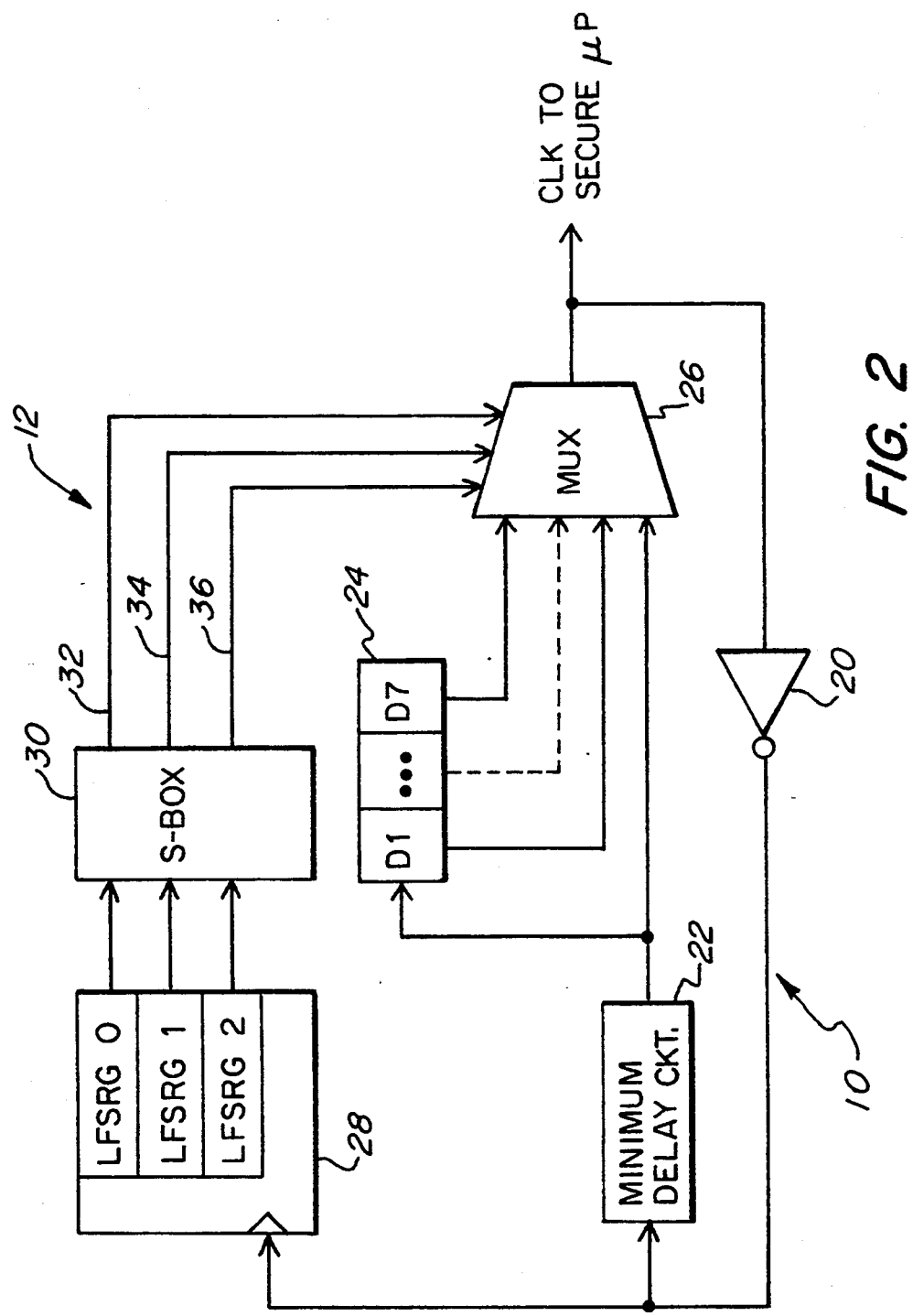
FIG. 2 is a block diagram illustrating a first embodiment of a ring oscillator clock and random delay circuit for modulating the clock.
Figure 3:
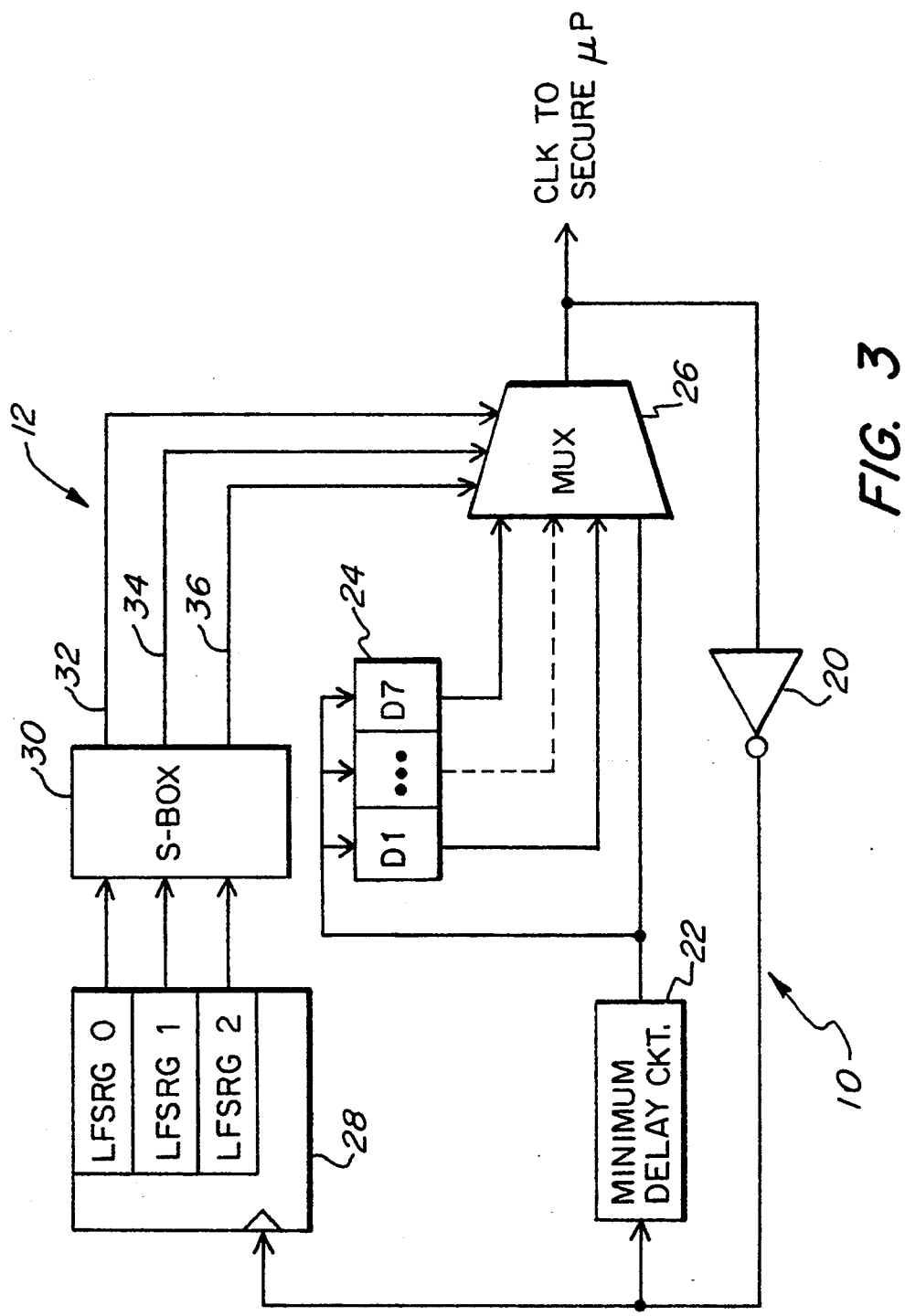
FIG. 3 is a block diagram of a second embodiment of a ring oscillator clock and modulator circuit for rendering a clock stream that is random and unpredictable.

FIGS. 2 and 3 illustrate two slightly different implementations of a modulated clock in accordance with the invention. The clock 10 comprises a minimum delay circuit 22 and an inverter 20 coupled in a ring configuration. Those skilled in the art will appreciate that any odd number of inverters can be provided in place of the single inverter 20 illustrated. When selected by the multiplexer 26, the minimum delay 22 sets the maximum clock rate that can be produced by the clock. Preferably, this delay will be set to provide the maximum clock rate at which the secure microprocessor can be operated.

In FIGS. 2 and 3, the substantially random modulation circuit 12 that modulates clock 10 comprises a series of delay stages 24, a multiplexer 26, a plurality of linear feedback shift register generators (LFSRGs) 28 and, optionally, a substitution box (S-Box) 30. The LFSRGs and S-Box provide control signals that are used by multiplexer 26 to select one of the delays provided by delay stages 24 for each clock pulse. The use of LFSRGs 28 enable the general requirements set forth above to be easily and controllably met. For example, the LFSRGs can be powered by a backup battery to retain their unpredictability even after application of a reset signal. If the secure microprocessor system utilizes secret, unit dependent random keys held in registers, and the initial state of the LFSRGs are a function of or identical to one or more of these key registers, then maximum unit-dependent unpredictability can be provided. Further, exact minimum and maximum delays around the ring can be calculated for the implementations of FIGS. 2 and 3, facilitating reliable manufacture and operation of the circuits.

In order to obtain a highly nonlinear (i.e., substantially unpredictable) sequence of control signals from the LFSRGs 28, it is desirable to combine the three separate bitstreams output from the three separate LFSRGs illustrated into a three-bit word used for delay selection. If the outputs of the separate generators were not combined, a pirate could conceivably defeat and isolate each generator's effects to enable the prediction of the future behavior of the modulator. Since such an approach depends on the linearity of the LFSRGs, the preferred embodiment of the present invention mixes the LFSRG outputs to provide a combined three-bit control word that is nonlinear and is used to select a delay value. A three-bit wide, eight entry deep lookup table can be used to provide the mixing. The lookup table maps a three-bit input (one bit from each of LFSRG 0, LFSRG 1, and LFSRG 2) into a new three-bit output in a highly nonlinear fashion.

In the preferred embodiment, a substitution box (S-Box) 30 is used to derive the lookup table. The design of suitable S-Boxes is well known in the art. One approach is disclosed in C. Adams and S. Tavares, "The Structured Design of Cryptographically Good S-Boxes," *Journal of Cryptology*, 3 (1990), pp. 27–41, describing a procedure for constructing S-Boxes that are bijective, highly nonlinear, possess the strict avalanche criterion, and have output bits which act (virtually) independently when any single input bit is complemented. S-Boxes can also be generated algorithmically, as set forth in U.S. Pat. No. 5,214,704.

A specific three-bit S-table that can be used in accordance with the present invention is:

| Input | Output |
|-------|--------|
| 0     | 1      |
| 1     | 2      |
| 2     | 6      |
| 3     | 5      |
| 4     | 4      |
| 5     | 7      |
| 6     | 3      |
| 7     | 0      |

This represents one of 40,320 candidate mappings (8!) of a three-bit input/output lookup table, and one of a much smaller set of mappings that meet the criteria set forth in the article of Adams and Tavares cited above.

The S-Box chosen will output the nonlinear control signals to multiplexer 26 via lines 32, 34 and 36. The control signals will actuate multiplexer 26 to output one of eight delays from minimum delay 22 or delay gates 24 (D1 ... D7). In the embodiment of FIG. 2, which can be implemented in very large scale integration (VLSI) using a minimum area for the modulator, the delay stages D1 ... D7 are provided in series, each stage adding an additional delay to the minimum delay provided by circuit 22. In the embodiment of FIG. 3, a more mathematically flexible maximum performance structure is provided. This structure does not require that the delay values be from a single delay line tapped at different points. Instead, each delay required is implemented in a parallel, discrete fashion.

The output of multiplexer 26 is the unpredictable clock signal CLK which is used to clock a secure microprocessor, such as processor 14 illustrated in FIG. 1. The CLK clock signal is fed back within the ring oscillator for use in generating the next successive clock pulse. By selecting one of the eight possible delays on a substantially random basis for each successive clock pulse, the desired substantially random clock CLK is provided.

The modulator 12 must be a self-timed structure that self-initializes and then propagates a change in logic state around a path of variable length (i.e., the ring oscillator). This path must effectively change length under the control of the pseudorandom data source provided by LFSRGs 28 and S-Box 30. The LFSRGs themselves must change state with each cycle of the modulator, and are therefore part of the modulator self-timing.

The pseudorandom bitstream output from S-Box 30 must vary the delay length of the ring oscillator between some minimum delay $T_{min}$ and some maximum delay $T_{max}$. This structure will guarantee bounds on output frequency, while allowing characteristics of the modulation bitstream to determine all other statistics such as distribution and average.

Long-term randomness requires a long generator that can produce many long runs of ones or zeros. Short-term randomness must come from a separate generator that is much shorter, but still long enough that it will not repeat during long runs of ones or zeros from the long-term generator. The length of these two generators must be carefully controlled so that they do not easily relate to each other. The provision of a medium-term generator facilitates the provision of a random bitstream, when combined with the short and long-term generators to form a clock modulating bitstream.

In the illustrated embodiment, the three generators LFSRG 0, LFSRG 1 and LFSRG 2 are used, each contributing one bit of a three-bit word that selects one of eight possible modulator output periods. LFSRG 0 provides the least significant bit of modulator period word, and has a long length such as $2^{40} - 1$, or $1.1 \times 10^{12}$. LFSRG 1 is of medium length such as $2^{32} - 1$, or $4.3 \times 10^9$, and provides the second period word bit. LFSRG 2 has a short length such as $2^6 - 1$, or 127. The length of the LFSRGs are all relatively prime to each other, and will not interact in a simple way. Note that with an output frequency on the order of 10 MHz, the repetition periods of these generators are $1.1 \times 10^5$ seconds (1.27 days), $4.3 \times 10^2$ seconds (seven minutes, nine seconds), and 12.7 microseconds. It is noted that in selecting the lengths of the LFSRGs, attention must be paid to their interaction such that there are no periods of modulation inactivity.

Attention must also be paid to the specific delays provided by delay gates 24. If all gate delays D in the ring oscillator are identical, then the modulation will produce a substantially randomly varying but regular set of output frequencies. The period of the Mth output will always be a multiple of this basic gate delay, $M \times D$, where M is modulated by taking on different integer values. If the individual gate delays are designed to be not identical, then a less regular output frequency set will result. These different gate delays must have a set of delays with complex interrelationships for all M possible values of modulation.

Various alternate implementations can be provided for the variable frequency source 10. Some of these are illustrated in FIGS. 4–7.

Figure 4:
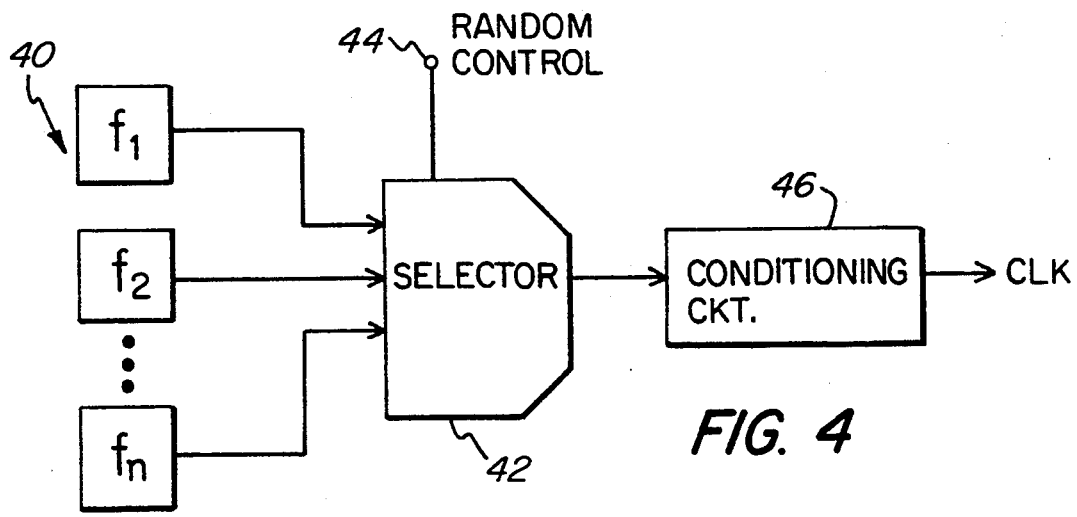
FIG. 4 is a third embodiment of a variable frequency source that can be used in accordance with the present invention.

In FIG. 4, a plurality of fixed digital or analog frequency sources 40 ($f_1, f_2 ... f_n$) are randomly selectable by a selector 42 by a random control signal input to terminal 44. The randomly selected output frequencies are conditioned (e.g., deglitched) in a conditioning circuit 46 which outputs the "modulated" clock for control of the crypto processor.

Figure 5:
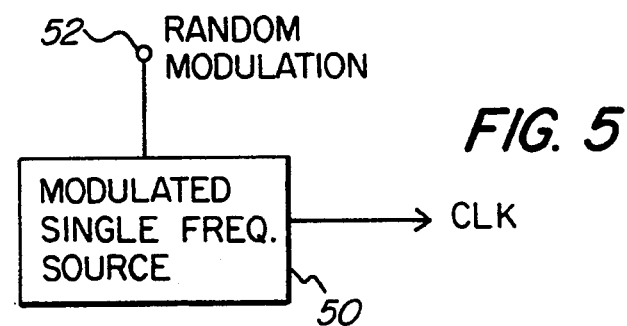
FIG. 5 is a fourth embodiment of a variable frequency source that can be used in accordance with the present invention.

In FIG. 5, a single frequency source 50 is modulated by random modulation input to terminal 52. The resultant modulated clock is used to control the crypto processor. Frequency source 50 can comprise an analog circuit, such as a voltage controlled oscillator, voltage controlled crystal oscillator, current controlled oscillator, Colpitts oscillator, Hartley oscillator, or the like. Any such analog oscillator should use a linear mode transistor. Variable analog delays can also be used, wherein real or parasitic capacitors are relied on to establish different delay periods as well known in the art. In a digital implementation, any type of ring oscillator can be used for single frequency source 50.

Figure 6:
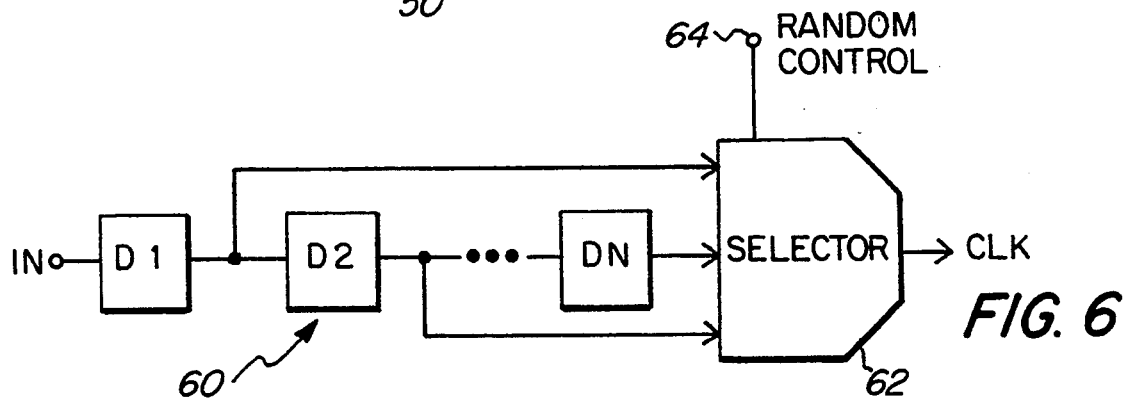
FIG. 6 is a fifth embodiment of a variable frequency source that can be used in accordance with the present invention.

FIG. 6 illustrates an embodiment in which tapped series delays generally designated 60 (D1, D2, ... DN) are introduced in the path of an input clock signal. A selector 62 selects the clock signal at random delay points in response to a random control signal input to terminal 64. The "modulated" output clock is used to clock the crypto processor. The delays can be provided by either analog or digital variable delay elements well known in the art.

Figure 7:
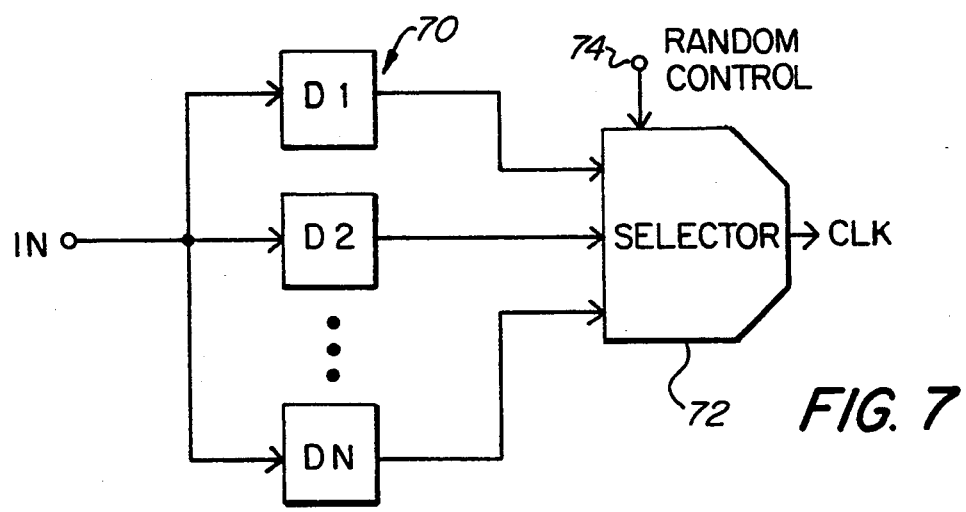
FIG. 7 is a sixth embodiment of a variable frequency source that can be used in accordance with the present invention.

FIG. 7 illustrates an embodiment in which different parallel delays generally designated 70 (D1, D2, ... DN) are selected by a selector 72 in response to a random control signal applied to terminal 74. In this embodiment, each of the delays 70 has a different duration and can comprise any analog or digital delay element known in the art. The "modulated" clock output from selector 72 is used to control the crypto processor.

It will now be appreciated that the present invention provides a method and apparatus for reducing the vulnerability of cryptographic processors to a security breach stemming from the observation of processor timing. A clock signal is modulated to provide a substantially random (i.e., completely random or pseudorandom) and unpredictable series of clock pulses for clocking a secure microprocessor. The modulation behavior is designed to resist analysis attempts of a pirate.

Although the invention has been described by reference to various specific embodiments, those skilled in the art will appreciate that numerous adaptations and modifications may be made thereto without departing from the spirit and scope of the invention, as set forth in the claims.

I claim:

1. A secure processor comprising:
   clock means for providing a clock signal;
   means for modulating said clock signal by a random signal to produce a random stream of clock pulses; and
   a microprocessor clocked by said stream of clock pulses for processing data in accordance with a security algorithm.

2. A secure processor in accordance with claim 1 wherein:
   said clock means comprises a ring oscillator; and
   said modulating means comprises a variable delay element for varying a delay of said ring oscillator.

3. A secure processor in accordance with claim 2 wherein:
   said ring oscillator comprises an inverter having an input port connected to an output port thereof via a signal path including said variable delay element;
   said variable delay element comprises a plurality of delay stages each connected via a respective signal path to delay a signal output from said inverter by a different amount of time; and
   said modulating means comprises means for selecting at least one of said delay stages per clock pulse to output a randomly delayed inverter output signal to said inverter input port.

4. A secure processor in accordance with claim 3 wherein said selecting means comprises:
   a plurality of linear feedback shift register generators clocked by prior clock pulses in said stream for outputting random control signals to select one of said delay stages for each successive clock pulse, thereby rendering the occurrence of each successive clock pulse random.

5. A secure processor in accordance with claim 4 wherein said modulating means further comprises substitution table means in series with said linear feedback shift register generators for increasing the nonlinearity of said control signals.

6. A secure processor in accordance with claim 1 wherein said modulating means comprise:
   a plurality of linear feedback shift register generators clocked by prior clock pulses in said stream for outputting random control signals to variably delay subsequent clock pulses of said stream.

7. A secure processor in accordance with claim 6 wherein said modulating means further comprise:
   a plurality of delay stages for delaying the clock pulses of said clock signal by different amounts of time; and
   means for receiving said control signals and selecting one of said delay stages for each successive clock pulse in response to said control signals to render the occurrence of each successive clock pulse random.

8. A secure processor in accordance with claim 7 wherein said modulating means further comprise substitution table means in series with said linear feedback shift register generators for increasing the nonlinearity of said control signals.

9. Apparatus for clocking a secure processor comprising:
   a variable frequency source for providing an output signal;
   means for randomly modulating said output signal to produce a random stream of clock pulses; and
   means for applying said stream of clock pulses to a clock input of said secure processor.

10. Apparatus in accordance with claim 9 wherein said modulating means comprise:
    a plurality of linear feedback shift register generators clocked by prior clock pulses in said stream for outputting random control signals to select delays for subsequent clock pulses of said stream.

11. Apparatus in accordance with claim 10 further comprising substitution table means in series with said linear feedback shift register generators for increasing the nonlinearity of said control signals.

12. Apparatus in accordance with claim 11 wherein said modulating means further comprise:
    a multiplexer connected via a signal path to receive pulses from a plurality of different selectable delays, said multiplexer also being connected to receive said control signals from said linear feedback shift register generators for controlling the multiplexer to output randomly delayed pulses forming said stream.

13. Apparatus in accordance with claim 9 wherein said variable frequency source comprises a plurality of selectable fixed frequency sources and said modulating means modulates the output frequency of said variable frequency source, said modulating means comprising a selector connected to said fixed frequency sources for randomly selecting different ones of said fixed frequency sources to produce the output frequency of said variable frequency source.

14. Apparatus in accordance with claim 9 wherein said variable frequency source comprises an analog oscillator.

15. Apparatus in accordance with claim 9 wherein said variable frequency source comprises a digital oscillator.

16. A method for clocking a secure processor comprising the steps of:

randomly varying the timing of clock pulses in a clock stream to produce a random clock signal; and clocking said secure processor with said clock signal to thwart efforts to observe the behavior of said processor.

17. A method in accordance with claim 16 wherein the pulses in said clock signal are varied at a rate within a range that does not extend beyond a minimum and maximum operating rate of said secure processor.

18. A method in accordance with claim 17 wherein said range extends from about said minimum operating rate to about said maximum operating rate.

* * * * *